United States Patent
Tabata et al.

(10) Patent No.: US 7,190,486 B2
(45) Date of Patent: Mar. 13, 2007

(54) IMAGE PROCESSING APPARATUS AND IMAGE PROCESSING METHOD

(75) Inventors: Sunao Tabata, Yokohama (JP); Hiroki Kanno, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1003 days.

(21) Appl. No.: 10/054,990

(22) Filed: Jan. 25, 2002

(65) Prior Publication Data

US 2003/0142376 A1   Jul. 31, 2003

(51) Int. Cl.
*G06F 15/00* (2006.01)

(52) U.S. Cl. .................. 358/1.9; 358/515; 358/2.1; 358/518; 382/162; 382/163; 382/167; 345/603; 345/604; 345/673

(58) Field of Classification Search ............ 358/515, 358/1.9, 2.1, 518; 382/162, 163, 167; 345/603–605
See application file for complete search history.

(56) References Cited

U.S. PATENT DOCUMENTS

| 5,293,252 | A | | 3/1994 | Kim et al. ............... 358/432 |
|---|---|---|---|---|
| 5,357,354 | A | * | 10/1994 | Matsunawa et al. ....... 358/530 |
| 5,861,960 | A | | 1/1999 | Suzuki et al. ........... 358/432 |
| 5,973,802 | A | * | 10/1999 | Hirota et al. ............ 358/521 |
| 5,999,644 | A | * | 12/1999 | Sugiura .................. 382/162 |
| 6,115,150 | A | * | 9/2000 | Nakamura et al. ........ 358/521 |
| 6,118,552 | A | | 9/2000 | Suzuki et al. ........... 358/432 |
| 6,762,863 | B1 | * | 7/2004 | Minakuti et al. ......... 358/487 |
| 6,765,703 | B1 | * | 7/2004 | Watanabe ................ 358/514 |
| 7,006,708 | B1 | * | 2/2006 | Nako et al. ............. 382/294 |
| 2004/0156076 | A1 | * | 8/2004 | Togami et al. ........... 358/2.1 |
| 2004/0257621 | A1 | * | 12/2004 | Ishihara ................. 358/2.1 |
| 2005/0219661 | A1 | * | 10/2005 | Hirabayashi ............. 358/518 |
| 2005/0243347 | A1 | * | 11/2005 | Hayaishi ................ 358/1.9 |

FOREIGN PATENT DOCUMENTS

| JP | 2-144567 | | 6/1990 |
|---|---|---|---|
| JP | 5-153405 | | 6/1993 |
| JP | 05-207306 | * | 8/1993 |
| JP | 7-95416 | | 4/1995 |

OTHER PUBLICATIONS

U.S. Appl. No. 09/955,312, filed Sep. 19, 2001, Tabata et al.

* cited by examiner

*Primary Examiner*—Kimberly Williams
*Assistant Examiner*—Beniyam Menberu
(74) *Attorney, Agent, or Firm*—Foley & Lardner LLP

(57) ABSTRACT

An image processing apparatus and an image processing method of the present invention improves image quality during monochrome output by adaptively executional conversion from a color image signal to a monochrome image signal during monochrome image output, and by using outputs from color and monochrome sensors at the same time. Moreover, it lowers the cost of compressing a color signal by using a color sensor with a lower resolution than that of the monochrome sensor.

12 Claims, 14 Drawing Sheets

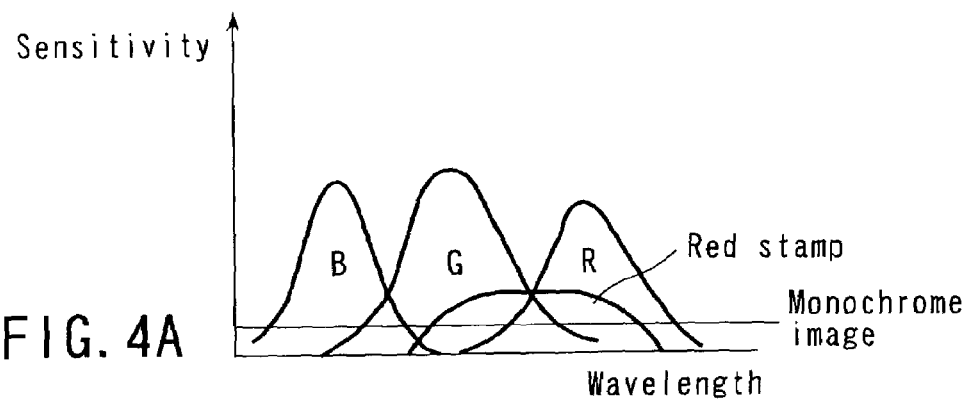
FIG. 4A
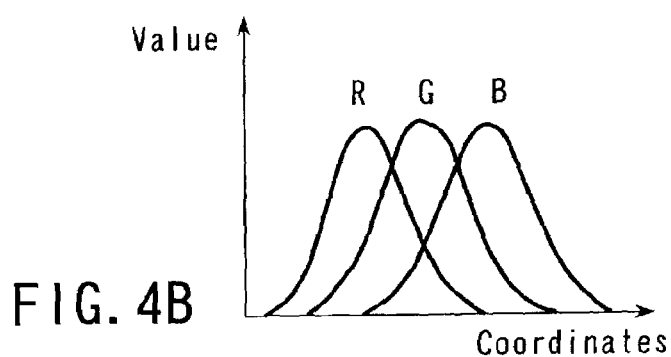
FIG. 4B
| Input | | | Output |
|---|---|---|---|
| 20a | 20b | 20c | |
| 0 | 0 | 0 | G signal |
| 0 | 0 | 1 | Average between G and B |
| 0 | 1 | 0 | G signal |
| 0 | 1 | 1 | G signal |
| 1 | 0 | 0 | Average between R and G |
| 1 | 0 | 1 | Average between R and G |
| 1 | 1 | 0 | G signal |
| 1 | 1 | 1 | G signal |
FIG. 6

FIG. 5A Original document

FIG. 5B R

| 200 | 200 | 0 | 10 | 240 | 0 |
| --- | --- | --- | --- | --- | --- |
| 200 | 200 | 0 | 10 | 240 | 0 |
| 200 | 200 | 0 | 10 | 240 | 0 |

FIG. 5C G

| 50 | 50 | 0 | 0 | 250 | 0 |
| --- | --- | --- | --- | --- | --- |
| 50 | 50 | 0 | 0 | 250 | 0 |
| 50 | 50 | 0 | 0 | 250 | 0 |

FIG. 5D B

| 10 | 10 | 0 | 0 | 240 | 10 |
| --- | --- | --- | --- | --- | --- |
| 10 | 10 | 0 | 0 | 240 | 10 |
| 10 | 10 | 0 | 0 | 240 | 10 |

| 50 | 50 | 0 | 0 | 250 | 0 |
| --- | --- | --- | --- | --- | --- |
| 50 | 50 | 0 | 0 | 250 | 0 |
| 50 | 50 | 0 | 0 | 250 | 0 |

↑ Red is light

| 87 | 87 | 0 | 3 | 243 | 3 |
| --- | --- | --- | --- | --- | --- |
| 87 | 87 | 0 | 3 | 243 | 3 |
| 87 | 87 | 0 | 3 | 243 | 3 |

↑ Red is dark   ↑ Character deterioration ↑

| 125 | 125 | 0 | 0 | 250 | 0 |
| --- | --- | --- | --- | --- | --- |
| 125 | 125 | 0 | 0 | 250 | 0 |
| 125 | 125 | 0 | 0 | 250 | 0 |

↑ Red is dark   ↑ No character deterioration

| RGB average | | K | Output |
|---|---|---|---|
| RGB average | ≦ K | K ≦ S4 | K |
| RGB average | > K | K ≦ S4 | K |
| RGB average | ≦ K | S4 < K < S5 | K |
| RGB average | > K | S4 < K < S5 | RGB + K average |
| RGB average | ≦ K | S5 ≦ K | K |
| RGB average | > K | S5 ≦ K | K |

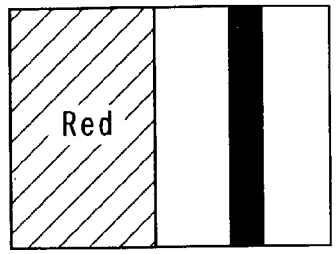
FIG. 12A  Original document
FIG. 12B — R
FIG. 12C — G
FIG. 12D — B
FIG. 12E — K
FIG. 12F — Red is light
FIG. 12G — Red is dark

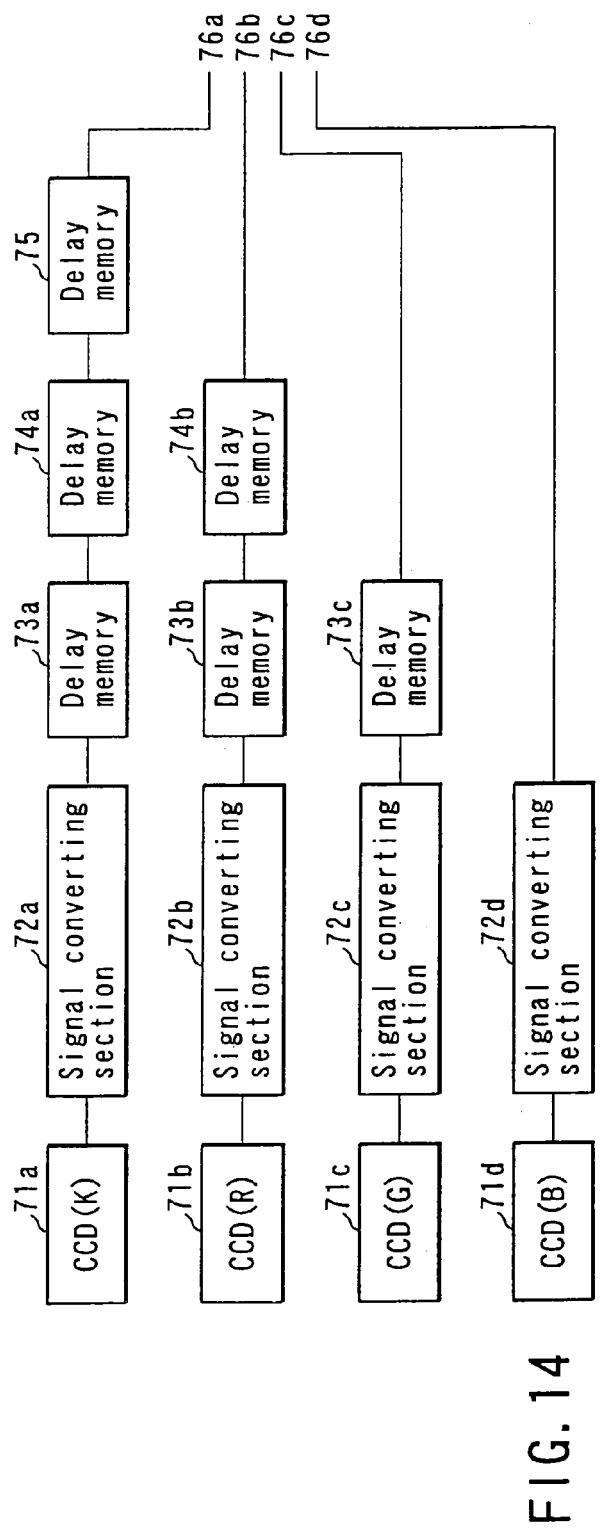
FIG. 14
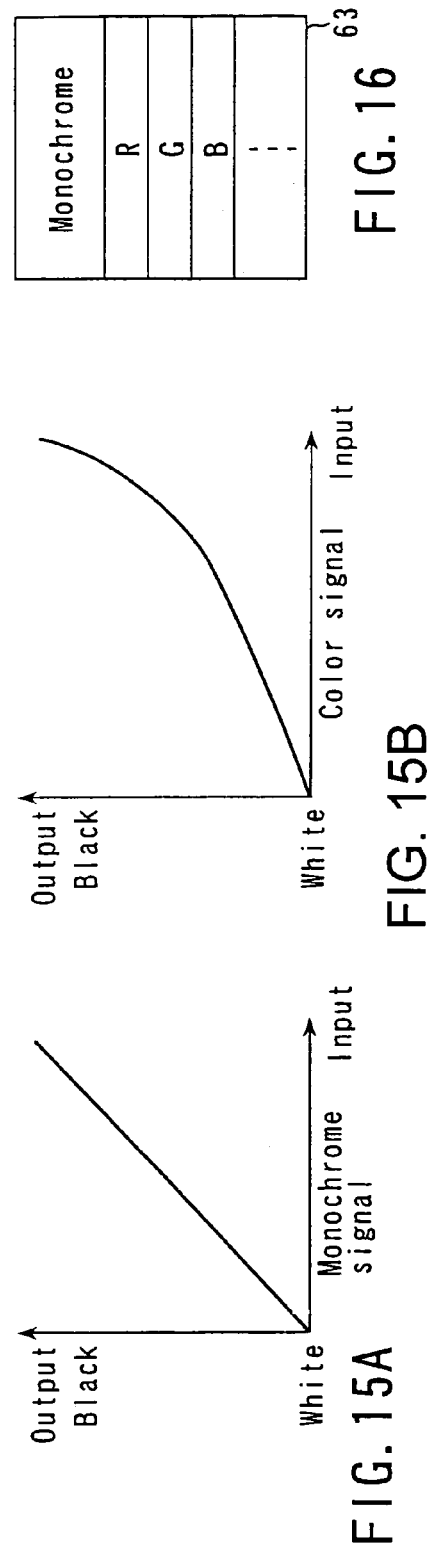
FIG. 15A
FIG. 15B
FIG. 16

Original document

| 200 | 5 | 120 |
|---|---|---|
| 200 | 5 | 120 |
| 200 | 5 | 120 |

Monochrome R
resolution

| 50 | 0 | 125 |
|---|---|---|
| 50 | 0 | 125 |
| 50 | 0 | 125 |

G

| 10 | 0 | 125 |
|---|---|---|
| 10 | 0 | 125 |
| 10 | 0 | 125 |

B

| 58 | 62 | 0 | 0 | 250 | 0 |
|---|---|---|---|---|---|
| 58 | 62 | 0 | 0 | 250 | 0 |
| 58 | 62 | 0 | 0 | 250 | 0 |

K

| 78 | 1 | 124 |
|---|---|---|
| 78 | 1 | 124 |
| 78 | 1 | 124 |

RGB average

| 60 | 0 | 125 |
|---|---|---|
| 60 | 0 | 125 |
| 60 | 0 | 125 |

K average

| 18 | 1 | −1 |
|---|---|---|
| 18 | 1 | −1 |
| 18 | 1 | −1 |

RGB average−K average

| 4 | 0 | 250 |
|---|---|---|
| 4 | 0 | 250 |
| 4 | 0 | 250 |

Monochrome
difference
absolute value

| 76 | 80 | 1 | 1 | 250 | 0 |
|---|---|---|---|---|---|
| 76 | 80 | 1 | 1 | 250 | 0 |
| 76 | 80 | 1 | 1 | 250 | 0 |

(RGB average−K average)+(K1,K2)  (K1,K2)

IMAGE PROCESSING APPARATUS AND IMAGE PROCESSING METHOD

BACKGROUND OF THE INVENTION

The present invention relates to an image processing apparatus and an image processing method.

Conventionally, an image processing apparatus such as, for example, a color copying machine executes a color printing process on the basis of a color image signal from a color sensor, and when monochrome printing is desired or copy of a monochrome original document is executed, it converts the color image signal from the color sensor into a monochrome image signal and executes a monochrome printing process on the basis of the monochrome image signal. Then, for determination between color and monochrome, there are adopted methods for determining by once storing the color image signal in a memory, by pre-scanning, and the like.

Moreover, there is generally executed a method in which, when the color image signal is stored in the memory, the color image signal is compressed after being converted from a luminance-system signal into a color-difference-system signal so as to be stored in the memory.

That is, for example, Japanese Patent No. 2755972 discloses a technique relating to a color image processing apparatus determines whether the color image signal from the color sensors of RGB is color or monochrome every pixel, and as a result, when it is monochrome, processes the monochrome pixels as the monochrome image signals by using only the image signal of G, so that the apparatus generates a good monochrome image signal by preventing a sensor error, which is an inconvenience of the color sensor, from occurring.

However, although this technique can generate a good image by preventing the sensor error from occurring concerning monochrome characters being color-processed and the like, when the monochrome process is desired for all pixels, there has been a possibility that the picture quality of the original document with poor sensitivity of a G signal such as one with a red stamp or one written by a blue ball-point pen deteriorates since the technique generates the monochrome image signal by using only the image signal of G.

Moreover, Japanese Patent No. 2720924 discloses a technique relating to a coding apparatus for the image signal that stores the color image signal from the color sensor in the memory after converting it from the luminance-system signal into the color-difference-system signal, and it outputs either a color-compressed result or a monochrome-binary-compressed result to a transmission path in accordance with the result of the determination between a predetermined color or monochrome.

However, there has been a possibility that the picture quality deteriorates during monochrome output since the technique stores only the color image signal from the color sensor in the memory.

Moreover, Jpn. Pat. Appln. KOKAI Publication No. 5-153405 discloses a technique that executes efficient coding by implementing blocking of the image on the basis of a luminance signal and a sub-sampled color difference signal and by extracting an outline from a luminance component in the block unit.

However, there has been a problem that a required capacity of the memory increases since execution of sampling concerning the color difference is necessary in this technique.

BRIEF SUMMARY OF THE INVENTION

In the light of the above-mentioned problems, the present invention has following objects. That is, to improve picture quality during monochrome output by adaptively implementing conversion from the color image signal into a monochrome image signal during monochrome output, and by using outputs from color and monochrome sensors at the same time. Moreover, it lowers cost of compressing a color signal by using the color sensor with a lower resolution compared with that of the monochrome sensor.

In order to attain the objects above, according to a first aspect of the present invention, there is provided an image processing apparatus comprising: a image pickup element which picks up an image and outputs a color image signal; a controlling section which outputs a signal that selects a color image output or a monochrome image output; and a converting section which receives an input of the color image signal from the image pickup element, and in the case where the color image output is selected by the signal from the controlling section, outputs the color image signal, and in the case where the monochrome image output is selected, adaptively converts the color image signal into the monochrome image signal on the basis of a characteristic nature of the image so as to output the monochrome image signal.

According to a second aspect of the present invention, there is provided an image processing apparatus comprising: a image pickup element which picks up an image and outputs a color image signal and a monochrome image signal; a controlling section which outputs a signal that selects a color image output or a monochrome image output; and a converting section which receives an input of the color image signal from the image pickup element, and in the case where the color image output is selected by the signal from the controlling section, outputs the color image signal, and in the case where the monochrome image output is selected, and outputs the monochrome image signal that can be acquired by converting the monochrome image signal and the color image signal on the basis of a characteristic nature of the image.

According to a third aspect of the present invention, there is provided an image processing apparatus comprising: a image pickup element which picks up an original document and outputs a color image signal and a monochrome image signal; a memory section which holds the monochrome image signal and the color image signal at the same time; and a determining section which determines whether the image of the original document is color or monochrome on the basis of the color image signal.

According to a fourth aspect of the present invention, there is provided an image processing apparatus which executes compression by dealing with a color difference signal in a lower resolution comparing with a luminance signal in a luminance/color-difference space concerning a color image signal, wherein the color image signal is composed of a monochrome image signal and a color signal with a lower resolution than that of the monochrome image signal, the luminance signal is generated from the monochrome image signal or the monochrome image signal and the color signal, and the monochrome image signal and the color signal are input by a monochrome sensor and a color sensor with a lower resolution than that of the monochrome sensor.

According to a fifth aspect of the present invention, there is provided an image processing apparatus which decodes a compressed signal by dealing with a color difference signal in a lower resolution comparing with a luminance signal in a luminance/color-difference space concerning a color image signal and generates a decoded image signal, wherein the decoded image signal is composed of a monochrome image signal with a high resolution and a color image signal with a low resolution.

According to a sixth aspect of the present invention, there is provided an image processing method comprising: picking up an image and outputting a color image signal by a image pickup element; outputting a signal that selects a color image output or a monochrome image output from a controlling section; and receiving an input of the color image signal from the image pickup element, and in the case where the color image output is selected by the signal from the controlling section, outputting the color image signal, and in the case where the monochrome image output is selected, adaptively converting the color image signal into the monochrome image signal on the basis of a characteristic nature of the image so as to output the monochrome image signal by a converting section.

According to a seventh aspect of the present invention, there is provided an image processing method comprising: picking up an image and outputting a color image signal and a monochrome image signal by a image pickup element; outputting a signal that selects a color image output or a monochrome image output by a controlling section; and receiving an input of the color image signal from the image pickup element, and in the case where the color image output is selected by the signal from the controlling section, outputting the color image signal, and in the case where the monochrome image output is selected, outputting the monochrome image signal that can be acquired by converting the monochrome image signal and the color image signal on the basis of a characteristic nature of the image by a converting section.

According to an eighth aspect of the present invention, there is provided an image processing method comprising: picking up an original document and outputting a color image signal and a monochrome image signal by a image pickup element; holding the monochrome image signal and the color image signal at the same time by a memory section; and determining whether the image of the original document is color or monochrome on the basis of the color image signal by a determining section.

According to a ninth aspect of the present invention, there is provided an image processing method which executes compression by dealing with a color difference signal in a lower resolution comparing with a luminance signal in a luminance/color-difference space concerning a color image signal, wherein the color image signal is composed of a monochrome image signal and a color signal with a lower resolution than that of the monochrome image signal, the luminance signal is generated from the monochrome image signal or the monochrome image signal and the color signal, and the monochrome image signal and the color signal are input by a monochrome sensor and a color sensor with a lower resolution than that of the monochrome sensor.

According to a tenth aspect of the present invention, there is provided an image processing method which decodes a compressed signal by dealing with a color difference signal in a lower resolution comparing with a luminance signal in a luminance/color-difference space concerning a color image signal and generates a decoded image signal, wherein the decoded image signal is composed of a monochrome image signal with a high resolution and a color image signal with a low resolution.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is a graph showing a spectral sensitivity of a CCD of the scanner 1, and FIG. 4B is a graph for explaining that read-out positions of the respective image signals of RGB are slightly different from each other even if correction is executed;

FIGS. 5A to 5G explain the detail of characteristics concerning a result processed by the image processing apparatus in the first embodiment of the present invention;

FIG. 6 shows setting of a selector 17;

FIGS. 12A to 12G explain the detail of characteristics concerning a result processed by the image processing apparatus in the second embodiment of the present invention;

FIG. 14 is a diagram showing a detailed configuration of a scanner 61;

FIG. 15A is a characteristic graph of a monochrome image signal, and FIG. 15B is a characteristic graph of a color image signal;

FIG. 16 is a diagram showing a detailed configuration of a memory 63;

FIG. 20 is a diagram showing a detailed configuration of a luminance converting section 110a;

DETAILED DESCRIPTION OF THE INVENTION

Hereinafter, an explanation will be given of embodiments of the present invention with reference to the accompanied drawings.

At first, a first embodiment of the present invention will be explained below.

Figure 1:
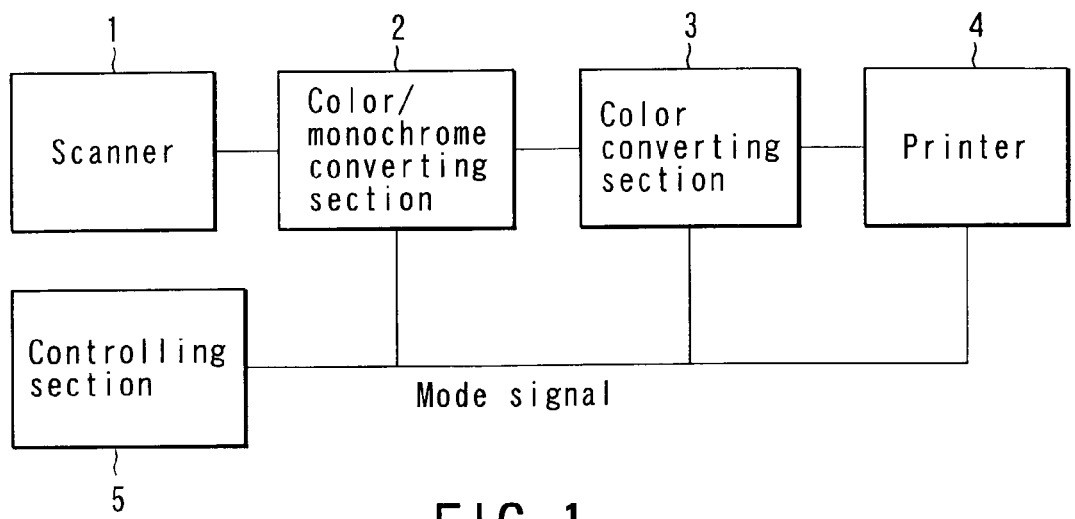
FIG. 1 is a diagram showing a configuration of an image processing apparatus according to a first embodiment of the present invention.

FIG. 1 shows a configuration of an image processing apparatus according to the first embodiment of the present invention. As shown in FIG. 1, the image processing apparatus comprises a scanner 1, a color/monochrome converting section 2, a color converting section 3, a printer 4, and a controlling section 5. Besides, color/monochrome conversion means conversion from color to monochrome.

In such a configuration, the scanner 1 picks up an image of an original document and outputs color image signals of RGB. The color/monochrome converting section 2 receives an input of the color image signal and outputs any one of the color image signal and a monochrome image signal generated from the color image signal to the color converting section 3 at a latter stage on the basis of a mode signal from the controlling section 5. Here, the mode signal means a signal for selecting one of a color mode output and a monochrome mode output. Then, when the signal from the color/monochrome converting section 2 is a color image signal, the color converting section 3 outputs the color image signal to the printer 4 after converting the signal into a CMYK signal. When the signal is a monochrome image signal, the color converting section 3 outputs the monochrome image signal to the printer 4. In the printer 4, a predetermined printing process based on the CMYK signal or the monochrome image signal is executed.

That is, if the processes above are organized for each mode, in this image processing apparatus, when a color output is selected by the mode signal from the controlling section 5, the color image signal from the scanner 1 is sent to the color converting section 3 through the color/monochrome converting section 2. Then, RGB/CMYK conversion (it means conversion from RGB into CMYK) is executed in the color converting section 3, and printing of each color based on the CMYK signal is executed in the printer 4.

Similarly, when monochrome output is selected by the mode signal from the controlling section 5, the color image signal from the scanner 1 is converted into the monochrome image signal in the color/monochrome converting section 2. Then, the monochrome image signal is sent to the printer 4 through the color converting section 3. Then, the printing based on the monochrome image signal is executed in the printer 4.

Figure 2:
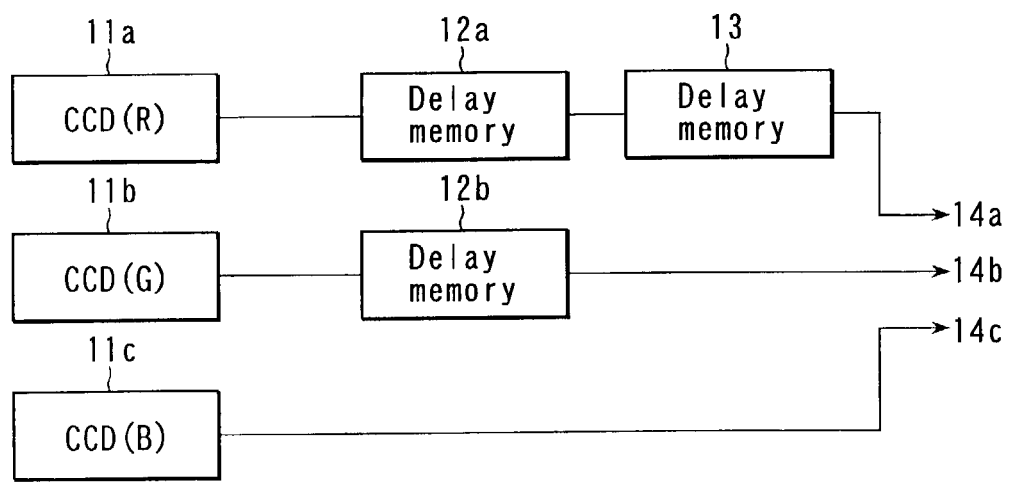
FIG. 2 is a diagram showing a detailed configuration of a scanner 1.

Here, FIG. 2 shows a detailed configuration of the scanner 1.

The scanner 1 is composed of a CCD(R) 11a, CCD(G) 11b, and CCD(B) 11c corresponding to the respective colors of RGB, and delay memories 12a, 12b, and 13. That is, the output from the CCD(R) 11a is connected to an output port 14a via delay memories 12a and 13. The output from the CCD(G) 11b is connected to an output port 14b via the delay memory 12b. Moreover, the output from the CCD(B) 11c is connected to an output port 14c.

In such a configuration, the image signals of RGB from the CCD(R) 11a, CCD(C) 11b, and CCD(B) 11c corresponding to the respective colors of RGB are output from the output ports 14a, 14b and 14c after positions among the CCDs 11a, 11b, and 11c are corrected by the delay memories 12a, 12b, and 13. Meanwhile, the image processing apparatus according to the first embodiment outputs regarding white and black to be 0 and 255, respectively.

Figure 3:
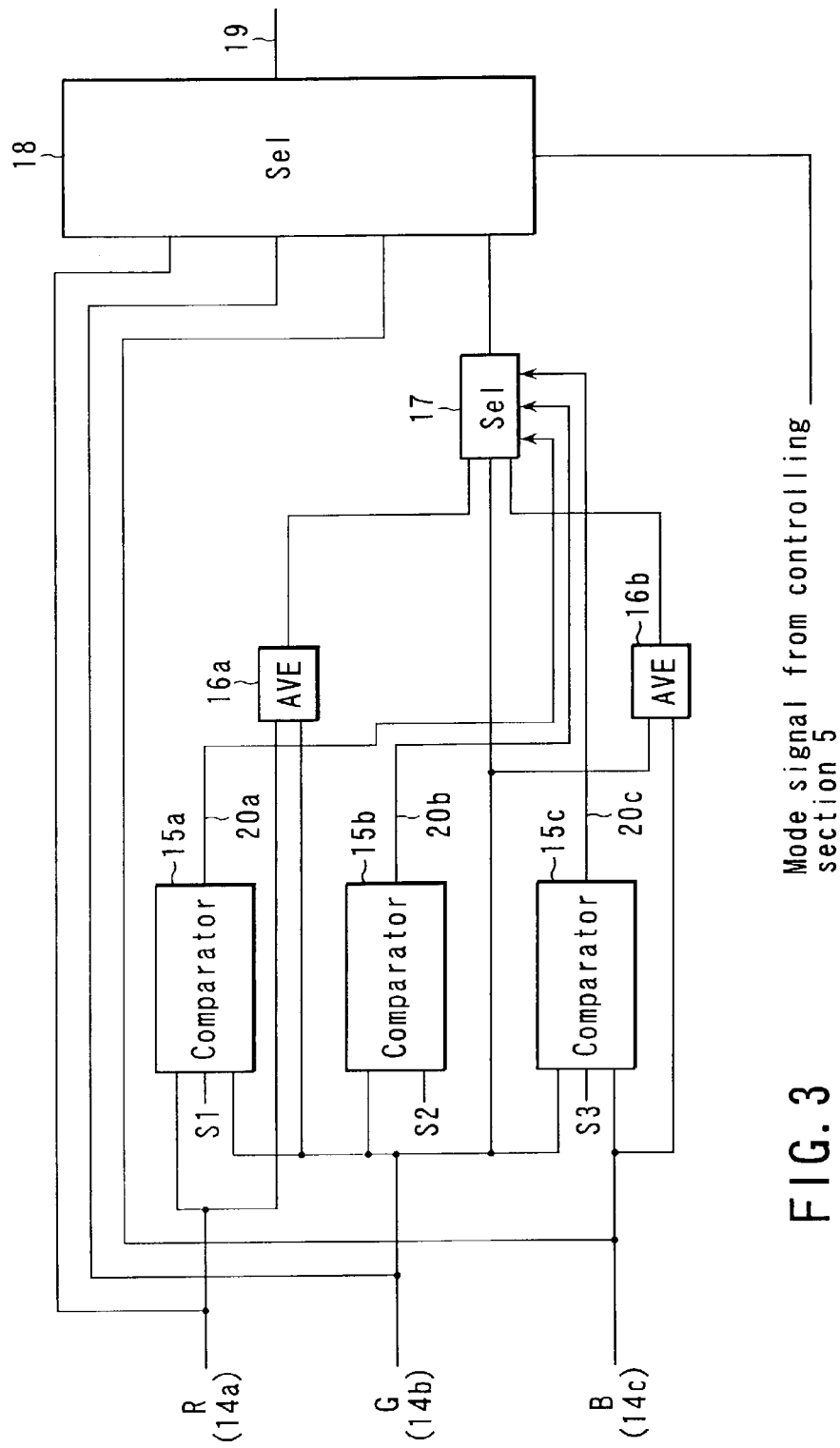
FIG. 3 is a diagram showing a detailed configuration of a color/monochrome converting section 2.

Next, the detailed configuration of the color/monochrome converting section 2 is as shown in FIG. 3. That is, the color/monochrome converting section 2 is composed of comparators 15a, 15b, and 15c, average operators 16a and 16b, and selectors 17 and 18.

In such a configuration, the comparator 15a compares the image signal of R with the image signal of G. Then, when a difference between them is greater than a threshold value S1, 1 is output, and otherwise, 0 is output at 20a. The comparator 15b compares the image signal of G with a threshold value S2. Then, when the image signal of G is greater than the threshold value S2, 1 is output, and otherwise, 0 is output 20b. The comparator 15c compares the image signal of G with the image signal of B. Then, when the difference between them is greater than a threshold value S3, 1 is output, and otherwise, 0 is output at 20c.

The average operator 16a calculates an average value between the image signal of R and the image signal of G. The average operator 16b calculates an average value between the image signal of G and the image signal of B. Then, the selector 17 selects any one of the output signals from the average operators 16a and 16b and the image signal of G. In this manner, the selector 18 outputs, at 19, the output signal from the selector 17 and the image signals of RGB by switching them on the basis of the mode signal from the controlling section 5.

Here, the CCD(R) 11a, CCD(G) 11b, and CCD(B) 11c of the scanner 1 have spectral sensitivity as shown in FIG. 4A.

Meanwhile, a horizontal axis indicates a wave length and a vertical axis indicates sensitivity in FIG. 4A.

While the monochrome original document is being scanned, all outputs from the CCD(R) 11a, CCD(G) 11b, and CCD(B) 11c become low, and the outputs from the CCD(R) 11a, CCD(G) 11b, and CCD(B) 11c become approximately the same.

Conversely, while, for example, a red stamp or the like is being scanned, an object contains much of wave length component relating to red so that the output of the image signal with a predetermined level can be acquired from the CCD(R) 11a. However, output levels of the image signals from the CCD(G) 11b and CCD(B) 11c are low. Accordingly, there is a problem that printing is difficult when the monochrome signals are generated with only the image signals of G.

Moreover, in the scanner 1 that acquires the image signals of RGB by using plural CCD(R) 11a, CCD(G) 11b, and CCD(B) 11c, as shown in FIG. 4B, read-out positions of the respective image signals of RGB are slightly different from each other even if correction thereof is executed. Owing to this, there is a problem that forms of characters are distorted if, for example, all of the image signals of RGB are simply averaged.

Hereinafter, characteristics concerning a result of processing by the image processing apparatus in the first embodiment of the present invention will be explained with reference to FIGS. 5A to 5G.

Figures 5E, 5F, 5G:
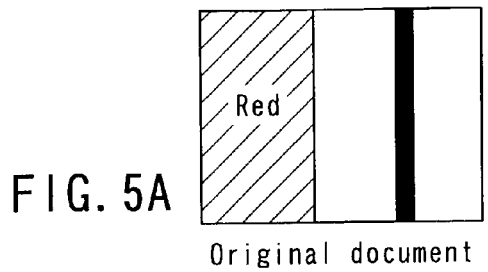

Particularly, FIG. 5G shows a processed result of the case where the threshold values S1 to S3 are set to be 100, and the selector 17 is set as shown in FIG. 6.

Hereinafter, an explanation will be given by contrasting the cases where the present invention is applied and where the present invention is not applied to each other.

As shown in FIG. 5A, an original document being an object has a red area and an area with a black line in a part thereof. Then, the image signals of RGB acquired as a result of picking up the image of such an original document by the respective CCD(R) 11a, CCD(G) 11b, and CCD(B) 11c of RGB are as shown in FIGS. 5B, 5C, and 5D.

Then, as shown in FIG. 5E, if only the image signal of G is used, the output corresponding to the red area of the original document becomes low so that it is inadequate.

Moreover, as shown in FIG. 5F, when the average of the image signals of RGB is taken and used, although the output corresponding to the red area of the original document is improved in some degree, the output corresponding to the area with the black line in the original document deteriorates so that it is also inadequate.

Conversely, when the present invention is applied, the output of the average operator 16a is selected as the output corresponding to the red area of the original document since the output of the image signal of R is large and the difference between the output of the image signal R and the output of the image signal of G is 150 as shown in FIG. 5G.

Then, concerning the output corresponding to a white area (RGB are all 0), the outputs from all comparators 15a, 15b, and 15c become 0. In the area in which the image signal of G is generated by a sensor error (G is 0 and R or B is 10), the outputs from all of the comparators 15a, 15b, and 15c become 0. Moreover, in the area in which the image signal of G is at a central position of the line (G is 250), only the comparator 15b has 1, and the image signal of G is selected.

As explained above, in the first embodiment of the present invention, the color image signal is adaptively switched and used as the monochrome image signal, and the monochrome image is printed and outputted so that monochrome image quality is improved. Moreover, although the average values of among G, R and G, and G and B are adaptively switched in the first embodiment, the color image signals are not limited to this. The image signals weighted to the respective values of RGB may be used, and needless to say, the switching method is also not limited to the one above.

Next, a second embodiment of the present invention will be explained.

Figure 7:
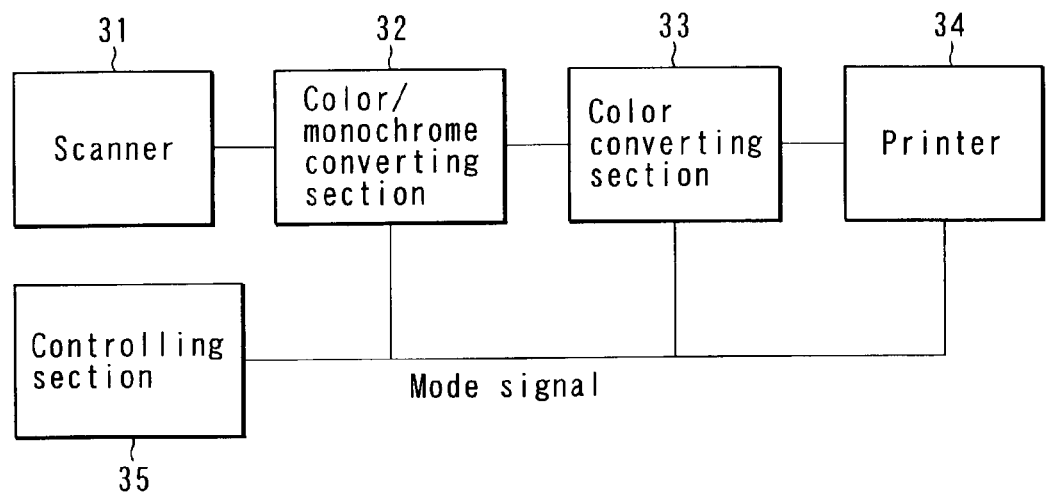
FIG. 7 is a diagram showing a configuration of an image processing apparatus according to a second embodiment of the present invention.

FIG. 7 shows a configuration of an image processing apparatus according to the second embodiment of the present invention. As shown in FIG. 7, the image processing apparatus comprises a scanner 31, a color/monochrome converting section 32, a color converting section 33, a printer 34, and a controlling section 35.

The second embodiment is to acquire color and monochrome outputs by using the scanner 31 that can input a color signal and a monochrome signal at the same time. Then, a basic configuration thereof is similar to that of the first embodiment above except that the scanner 31 and the color/monochrome converting section 32 are changed so that repeated explanations are omitted here.

Figure 8:
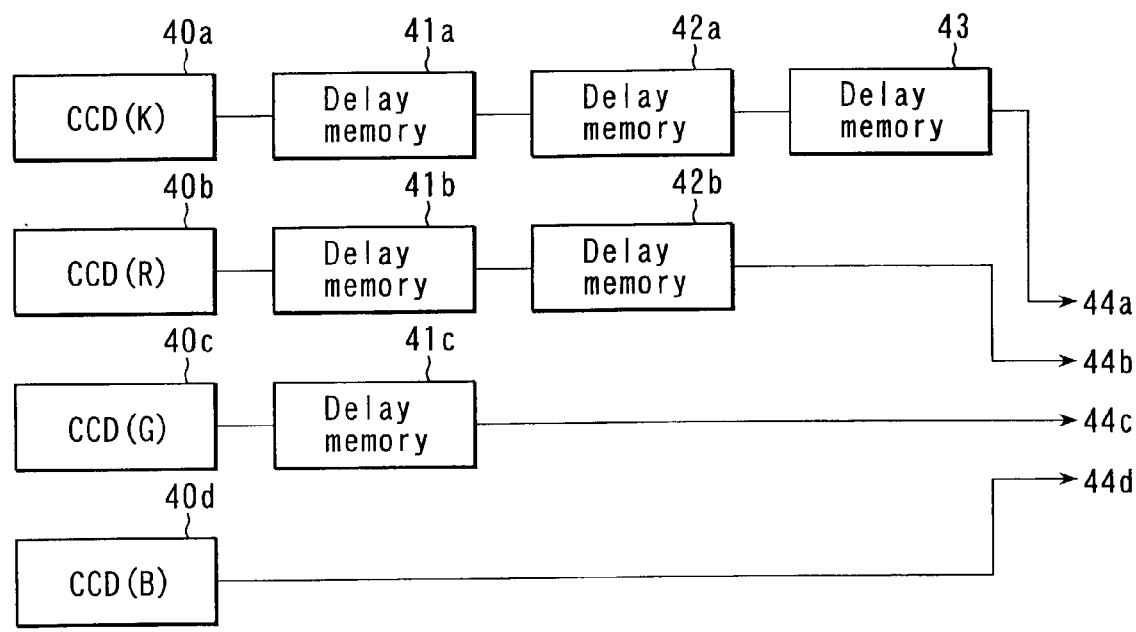
FIG. 8 is a diagram showing a detailed configuration of a scanner 31.

Here, FIG. 8 shows a detailed configuration of the scanner 31.

The scanner 31 is newly added with a CCD(K) 40a for monochrome, and has a configuration that can extract a color signal and a monochrome signal at the same time.

More minutely, in the scanner 31, the output from the CCD(K) 40a is connected to an output port 44a via delay memories 41a, 42a, and 43. An output from a CCD(R) 40b is connected to an output port 44b via delay memories 41b and 42b. An output from a CCD(G) 40c is connected to an output port 44c via a delay memory 41c. Then, an output from a CCD(B) 40d is connected to an output port 44d.

In such a configuration, the monochrome image signals from the respective CCD(K) 40a, CCD(R) 40b, CCD(G) 40c, and CCD(B) 40d, and the image signals of RGB are output from the output ports 44a to 44d after positional correction by the delay memories 41a, 41b, 41c, 42a, 42b, and 43.

Figure 9:
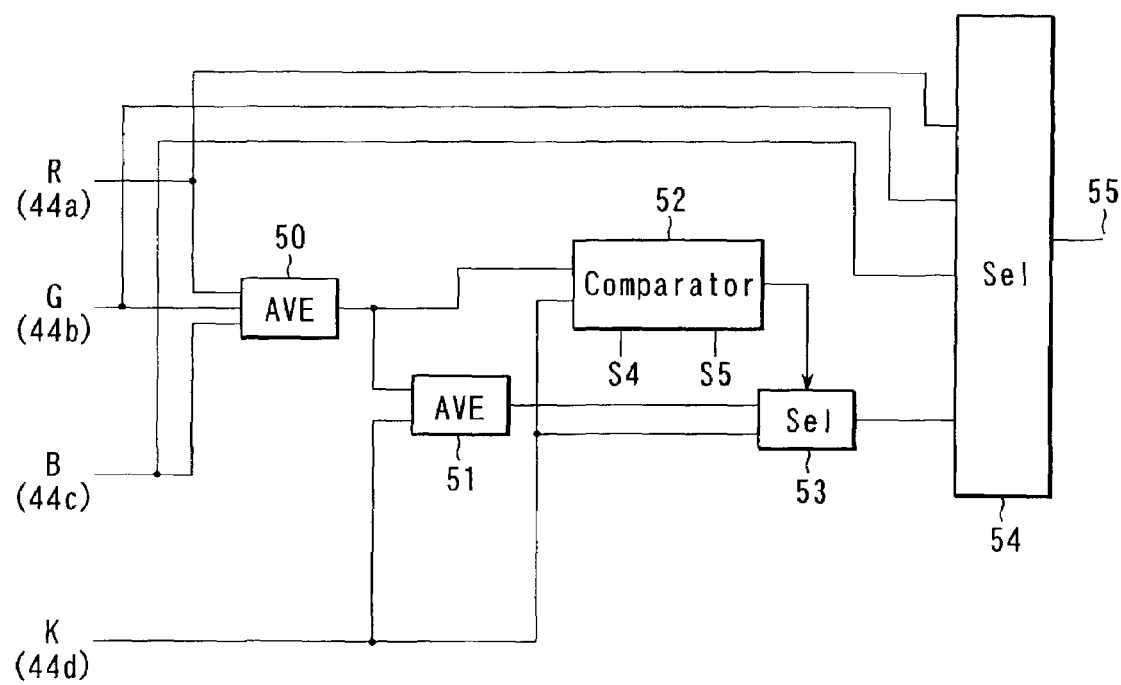
FIG. 9 is a diagram showing a detailed configuration of a color/monochrome converting section 32.

Next, the detailed configuration of the color/monochrome converting section 32 is as shown in FIG. 9. As shown in FIG. 9, the color/monochrome converting section 32 is composed of a comparator 52, average operators 50 and 51, and selectors 53 and 54.

In such a configuration, the average operator 50 calculates an average of the image signals of RGB. Then, the average operator 51 calculates an average between the signal relating to the average of the image signals of RGB and the image signal of K. The comparator 52 compares the signal relating to the average of the image signals of RGB and the output signal from the average operator 51 with threshold values S4 and S5, and it executes predetermined output on the basis of the compared result. The selector 53 outputs the signal relating to the average of the image signals of RGB and the image signal of K, and the image signal K by adaptively switching them on the basis of the output signal from the comparator 52.

This is the point that is different from the first embodiment above.

In this manner, the selector 54 switches the image signal from the selector 53 and the image signals of RGB on the basis of the mode signal from the controlling section 5 and outputs them as image signals at 55.

Figure 10:
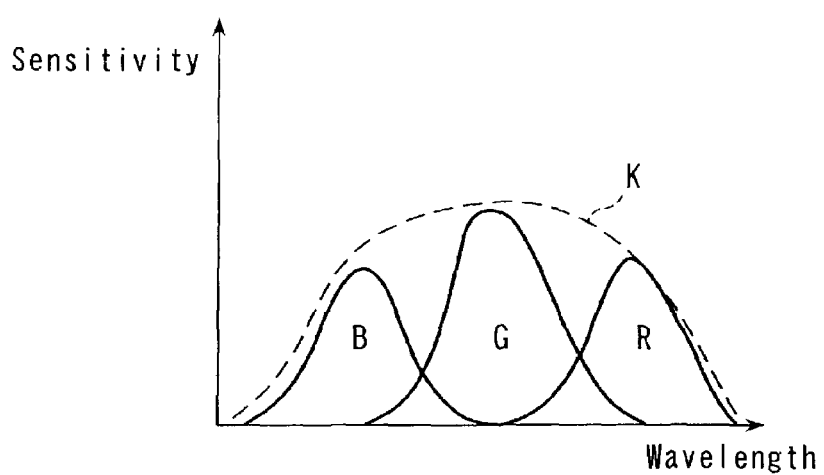
FIG. 10 is a graph showing a spectral sensitivity of a CCD of the scanner 31.

Here, the CCDs 40a to 40d of the scanner 31 have the spectral sensitivity as shown in FIG. 10. Meanwhile, a horizontal axis indicates a wave length and a vertical axis indicates a sensitivity in FIG. 4A. Although the CCD(K) 40a for monochrome covers spectral ranges of the CCDs 40b to 40d for color in general, the spectral sensitivity is different in each wave length area.

That is, the ranges of the CCDs 40b to 40d for color are standardized for each sensor. However, the CCD(K) 40a for monochrome is standardized by the color with the best spectral sensitivity (G in the example). Therefore, even if the sensitivity of the CCD(K) 40a for monochrome and of the CCDs 40b to 40d for color are the same, the outputs from them in the same wave length area are different from each other. Owing to this, concerning the outputs from the CCD when, for example, a red original document is picked up, the output from the CCD(K) 40a is lower than that of the output from the CCD(R) 40b.

Figures 11, 13:
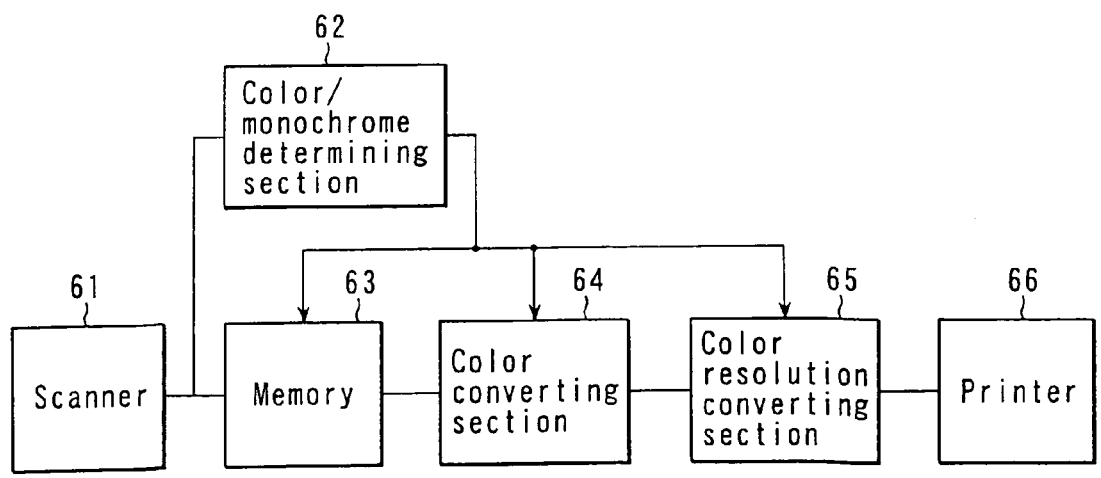
FIG. 11 shows setting of a selector 54.
FIG. 13 is a diagram showing a configuration of an image processing apparatus according to a third embodiment of the present invention.

Now, in the second embodiment, as shown in FIG. 11, only when an RGB average is greater than K in a specific density area of K, the signal relating to the RGB average is converted into the image signal of K and is selectively output. This is a characteristic point of the second embodiment.

Hereinafter, characteristic concerning a result of processing by the image processing apparatus in the second embodiment of the present invention will be explained in detail with reference to FIGS. 12A to 12G.

Particularly, FIG. 12G shows a processed result of the case where the threshold values S4 and S5 are set to be 0 and 100 respectively, and the selector 54 is set as shown in FIG. 11.

Hereinafter, an explanation will be given by contrasting the cases where the present invention is applied and where the present invention is not applied to each other.

As shown in FIG. 12A, an original document being an object has a red area and an area with a black line in a part thereof. The image signals acquired as a result of picking up the original document by the respective CCD(R) 40b, CCD (G) 40c, and CCD(B) 40d of RGB and CCD(K) 40a of K are shown in FIGS. 12B to 12E. As shown in FIG. 12F, when only the image signal of K is used, the output corresponding to the red area of the original document becomes low so that it is inadequate. When the present invention is applied, the output corresponding to the red area of the original document becomes high.

As explained above, in the second embodiment of the present invention, the monochrome image signal and the color image signal are adaptively switched and used when the monochrome image signal is generated so that the monochrome image quality is improved.

Next, a third embodiment of the present invention will be explained.

FIG. 13 shows a configuration of an image processing apparatus according to the third embodiment of the present invention. The image processing apparatus comprises a scanner 61, a color/monochrome determining section 62, a memory 63, a color converting section 64, a color resolution converting section 65, and a printer 66. Meanwhile, color/monochrome determination means determination between color and monochrome.

At first, FIG. 14 shows a configuration of the scanner 61.

The scanner 61 can input a color signal and a monochrome signal at the same time.

The scanner 61 is different from the scanner 31 in that a main scanning resolution of the color signal is ½ of that of the monochrome signal, and it has signal converting sections 72a to 72d for converting a bit number from 10 bits to 8 bits. Concerning the scanner 61, the resolution for color is half of the resolution for monochrome. Therefore, if the resolution for monochrome is the same as that of the scanner 31, half of the capacities of the delay memories 41a to 41c, 42a, 42b and 43 in FIG. 8 are sufficient as capacities of delay memories 73a to 73c, 74a, 74b, and 75. Afterward, the delayed signals are output to output ports 76a to 76d, respectively, as shown in FIG. 14. As shown in FIG. 15A and 15B, the signal converting sections 72a to 72d execute logarithmic conversion concerning the image signals of RGB from CCDs 71b to 71d and execute conversion of only the bit number concerning the monochrome image signal from a CCD(K) 71a, and they output the signals. The logarithmic conversion is executed concerning the image signals of RGB since a resolution performance thereof in a high-density area is important. The conversion from 8 bits into 8 bits is executed since gradation is formed from a nonexisting signal like the characteristic in FIG. 15B so that there is a possibility that a gradation skip and the like is generated.

Next, both color signals and monochrome signals are stored in the memory 63 as shown in FIG. 16. For example, a memory capacity of A4 becomes "monochrome of 33 MB+color of 33 MB×3=132 MB" when the resolutions for color and monochrome are both 600 dpi, and it becomes "monochrome of 33 MB+color of 17 MB×3=84 MB" when the resolution for color is 300 dpi and the resolution for monochrome is 600 dpi. Therefore, the memory capacity can remarkably be reduced.

Figure 17:
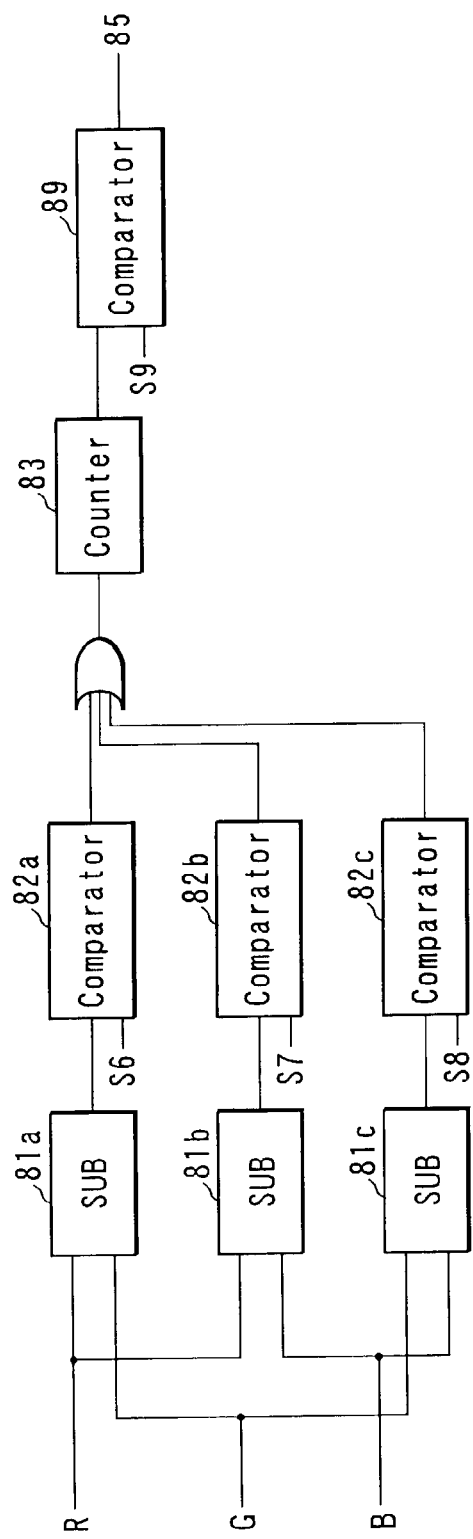
FIG. 17 is a diagram showing a detailed configuration of a color/monochrome determining section 62.

Next, the detailed configuration of the color/monochrome determining section 62 is as shown in FIG. 17. That is, the color/monochrome determining section 62 has difference devices 81a, 81b, and 81c, comparators 82a, 82b, and 82c, a counter 83, and a comparator 89.

In such a configuration, the absolute values of the differences among the respective image signals of RGB are taken, and the differences are compared with the threshold values S6 to S8. If the differences are large as a result of the comparison, 1 is output from the comparators 82a, 82b, and 82c. When any one of the signals from the comparators 82a, 82b, and 82c is 1, the counter 83 is counted-up.

Then, if the counted-up value (pixels with large differences among the color signals that are determined to be color) is a threshold value S9 or more over the entire image, the original document is determined as color original document as a result of color/monochrome determination and 1 is output by comparator 89 at 85. When the counted-up value is below the threshold value S9, the original document is distinguished to be a monochrome original document and 0 is output by comparator 89 at 85.

Besides that, the color converting section 64 executes the conversion from the image signals of RGB into the CMYK signal only when the result determined by a known color converting method is the color signal. The color resolution converting section 65 converts the resolution into the same resolution as the monochrome image signal by known linear interpolation. As clear from a flow of such a series of processes, basically, it is necessary to use all data of one screen in order to execute the color/monochrome determination.

Therefore, in order to determine a sort of color or monochrome from the original document and to switch the processes after this, it is necessary to acquire the determination result by storing scanner data in the memory 63 once or by pre-scanning like this embodiment.

Here, concerning a method in which handled signal systems for color and monochrome are different from each other, and the color signal or the monochrome signal is output in accordance with the determination result after the signals are stored in the memory 63 once, when only the color signal is stored in the memory 63 and switching to the monochrome process is executed in accordance with the determination result, it is necessary to generate the monochrome image signal by inverting again the logarithmic-converted image signals of RGB shown in FIG. 15A and FIG. 15B.

Therefore, in this case, the image quality during monochrome determination deteriorates.

Here, in this embodiment, deterioration of the image quality during the monochrome process is reduced by, in the case where both the color signal and the monochrome signal can be input at the same time, storing both signals in the memory 63. Moreover, the resolution of the color image signal is lower than the resolution of the monochrome image signal so that the memory capacity for storing can also be reduced.

Next, a fourth embodiment of the present invention will be explained.

Figure 18:
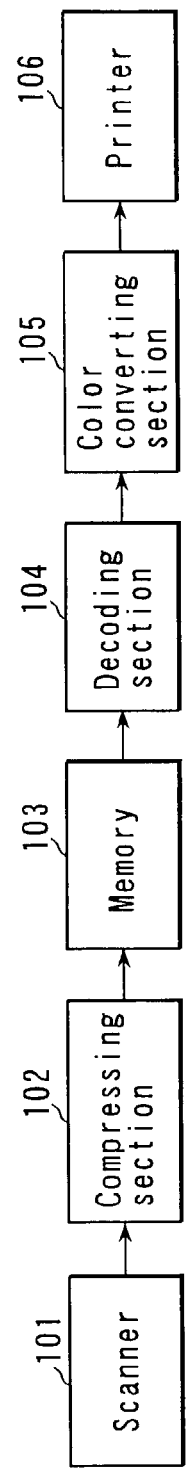
FIG. 18 is a diagram showing a configuration of an image processing apparatus according to a fourth embodiment of the present invention.

FIG. 18 shows a configuration of an image processing apparatus according to the fourth embodiment of the present invention. The image processing apparatus comprises a scanner 101, a compressing section 102, a memory 103, a decoding section 104, a color converting section 105, and a printer 106.

In such a configuration, signal converting sections for color and monochrome inside the scanner 101 are set in the same manner. An image signal is compressed by the compressing section 102 and then, it is stored in the memory 103. Then, the processes are approximately the same as those in the third embodiment except that the processes thereafter are executed concerning the signal properly read out from the memory 103 and decoded by the decoding section 104. Here, the repeated explanations are omitted.

Figure 19:
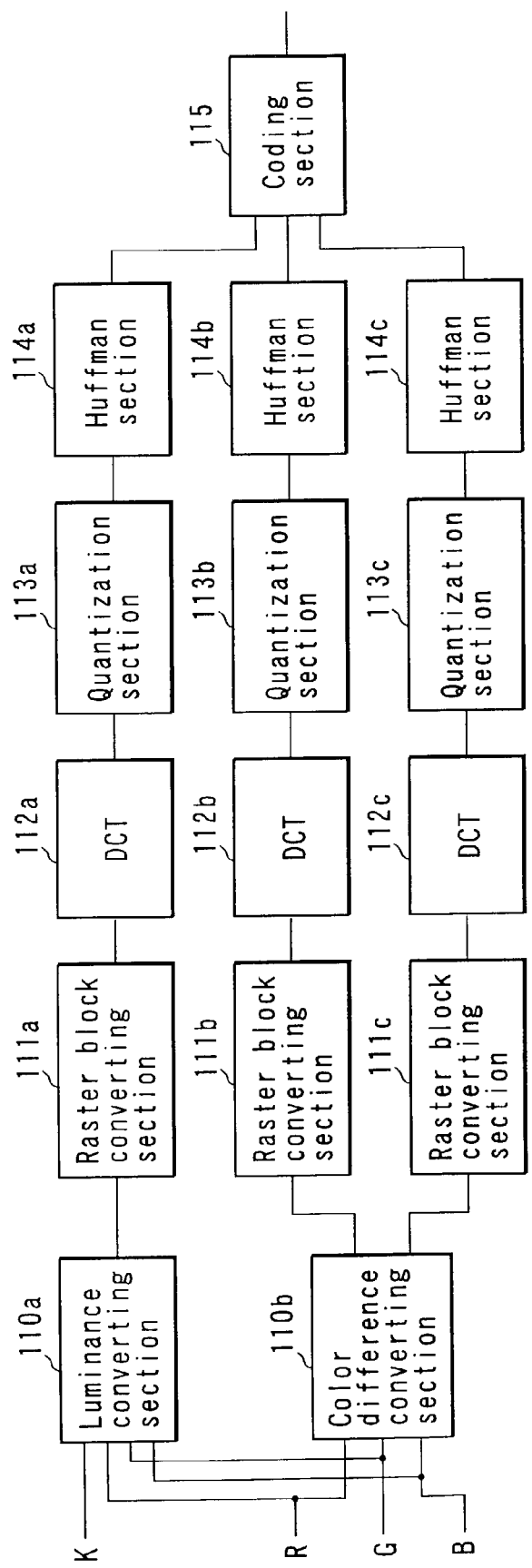
FIG. 19 is a diagram showing a detailed configuration of a compressing section 102.

Here, FIG. 19 shows a detailed configuration of the compressing section 102.

As shown in FIG. 19, the image signals of K and RGB are input to a luminance converting section 110a. An output from the luminance converting section 110a is connected to one input of a coding section 115 via a raster block converting section 111a, a DCT 112a, a quantization section 113a, and a Huffman section 114a. Moreover, the image signals of RGB are input to a color difference converting section 110b. An output from the color difference converting section 110b is connected to one input of the coding section 115 via a raster block converting section 111b, a DCT 112b, a quantization section 113b, and a Huffman section 114b, and are connected to the other input of the coding section 115 via a raster block converting section 111c, a DCT 112c, a quantization section 113c, and a Huffman section 114c. Then, in such a configuration, the image is subjected to block resolution into a size of 8×8 by using known JPEG and is compressed for each luminance/color difference.

In general, the image quality of the color difference signal is good even in the lower resolution comparing with that of the luminance signal so that the color difference signal is compressed after the resolution is lowered.

Figure 20:
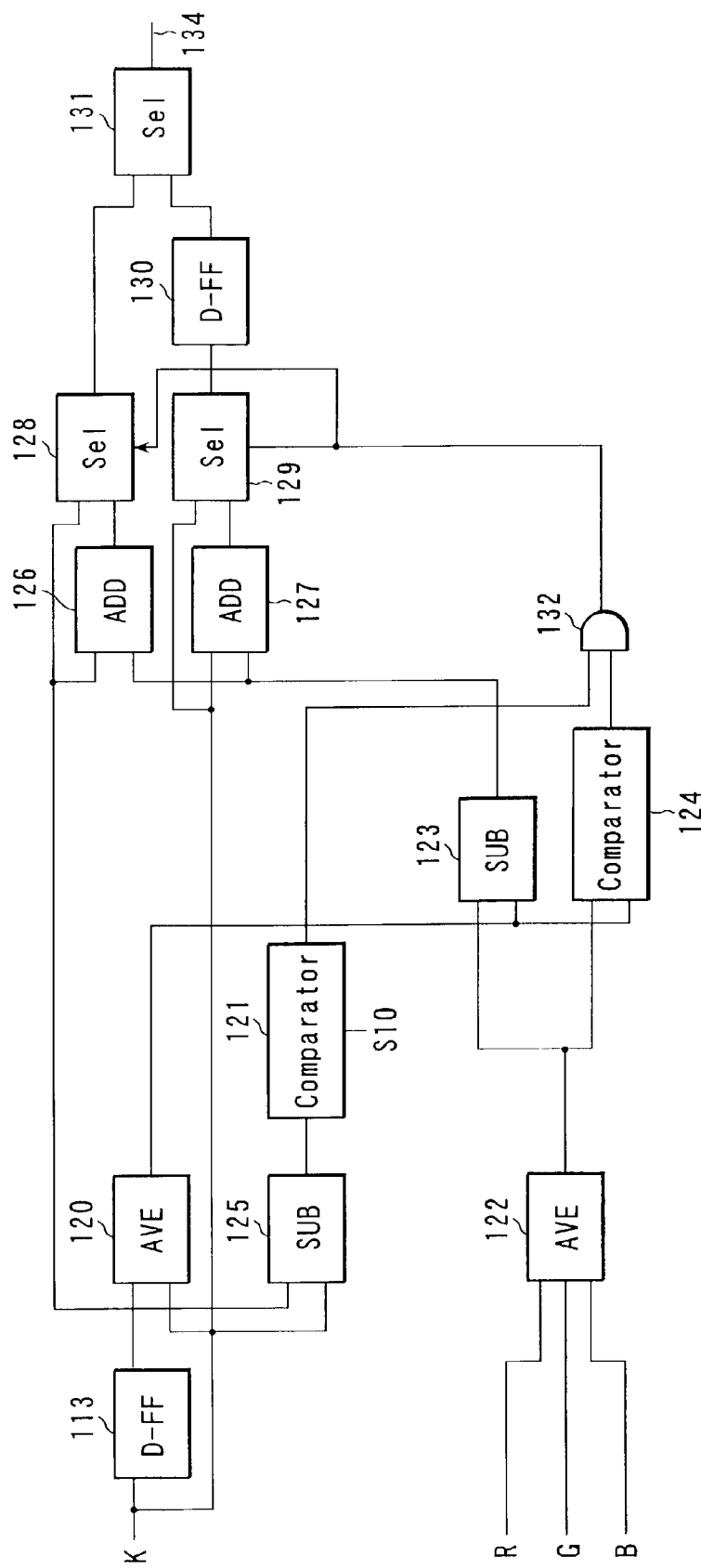

Now, in the fourth embodiment, the color difference signal with the low resolution is generated by using the image signals of RGB with the low resolution in the known color difference converting section 110b, and the luminance signal with the high resolution is generated and compressed from the monochrome signal with the high resolution and the image signals of RGB with the low resolution by using the luminance converting section 110a shown in FIG. 20.

At the time, the luminance/color difference conversion and the inversion are executed by the following:

$$\begin{vmatrix} Y \\ I \\ Q \end{vmatrix} = \begin{vmatrix} 0.25 & 0.5 & 0.25 \\ 1.0 & -1.0 & 0.0 \\ 0.0 & 1.0 & -1.0 \end{vmatrix} \begin{vmatrix} R \\ G \\ B \end{vmatrix}$$

$$\begin{vmatrix} R \\ G \\ B \end{vmatrix} = \begin{vmatrix} 1.0 & 0.75 & 0.25 \\ 1.0 & -0.25 & 0.25 \\ 1.0 & -0.25 & -0.75 \end{vmatrix} \begin{vmatrix} Y \\ I \\ Q \end{vmatrix}$$

In the luminance converting section 110a in FIG. 20, an average value in 2-pixel unit and an absolute value of the difference between 2 pixels are calculated by using an average operator 120 and a difference section 125 after matching the monochrome image signal with the high resolution with the resolution of the color image signal at D-FF 113. Then, the difference value is compared with a threshold value S10 at a comparator 121. As a result of the comparison, when the difference value is below the threshold value S10, 1 is output regarding the area to be flat, and otherwise, 0 is output to AND gate 132.

Concerning the color signal with the low resolution, 0.25×R+0.5×G+0.25×B is calculated by matching the average value of the three signals to a formula according to the conversion from RGB into YIQ at an average section 122.

The average value of the monochrome signals is compared with the average value of the color signals, determined using the average operator 122, in the comparator 124, and when the color average>monochrome average, 1 is output regarding the color is the color whose sensitivity is lowered at the sensor for monochrome, and otherwise, 0 is output at AND gate 123. A difference value of the average value of the color signals is determined by a difference section 123.

Then, concerning logical operation by adders 126 and 127, selectors 128 and 129, a D-FF 130, and a selector 131, when the pixel is in the flat area and in an area in which the sensitivity is lowered at the sensor for monochrome such as the red or blue area, the result of the following operation expression is output as the luminance signal from the selector 131 at 134 regarding it to be 1, and otherwise, the monochrome signal is output as it is as the luminance signal from the selector 131 regarding it to be 0.

$K'$, $K''$=(color average−monochrome average)+($K1$, $K2$)

K1 and K2 are the monochrome signal with the high resolution.

This is to execute correction since the luminance signal from the RGB signal and the monochrome signal are not necessarily equal as clear from spectral sensitivity characteristic in FIG. 10 so that the RGB value is not correctly converted during the inversion.

Hereinafter, an explanation will be given by contrasting the cases where the present embodiment is applied and where the present embodiment is not applied.

Here, the threshold value S10 is assumed to be 200. In the flat area, the luminance signal is generated by using the color image signal being the output from the CCD of RGB, and the monochrome image signal is used as it is as the luminance signal in an edge area.

Figures 21A, 21B, 21C, 21D, 21E, 21F, 21G, 21H, 21I, 21J:
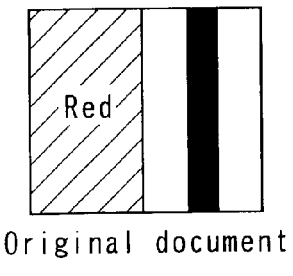
FIGS. 21A to 21J explain the detail of characteristics concerning a result processed by the image processing apparatus in the fourth embodiment of the present invention.

As shown in FIG. 21A, an original document being an object has a red area and a area with a black line in its part. The image signal acquired as a result of picking up the original document by the respective CCDs of RGB and K is shown in FIGS. 21B to 21E.

Then, the image signal of the case where the average of RGB is taken is shown in FIG. 21F, the image signal of the case where the average of K is taken is shown in FIG. 21G, and the image signal of the case where the difference of the average of K from the RGB average is taken is shown in FIG. 21H, and the image signal of the case where the absolute value of the difference is taken is shown in FIG. 21I.

In this invention, as shown in FIG. 21J, the difference between the RGB average and the K average to which (K1, K2) is added is adopted as the pixel corresponding to the red area of the original document, and (K1, K2) is adopted as the pixel corresponding to the area with the black line.

As explained above, in the fourth embodiment of the present invention, the monochrome image signal and the color image signal are adaptively switched and used when the monochrome image signal is generated so that the monochrome image quality is improved.

As explained above, in the embodiments of the present invention above, in the image processing apparatus that can input both the color signal and the monochrome signal at the same time and that converts the image signal from the color sensor with the low resolution into the luminance/color difference signal system and compresses it, memory cost for raster block conversion during the color conversion can be reduced, and a luminance signal and a color difference signal with high picture quality can be acquired even in the above-described device by adaptively generating the luminance signal by using both the monochrome image signal with high resolution and the color image signal with lower resolution.

Figure 22:
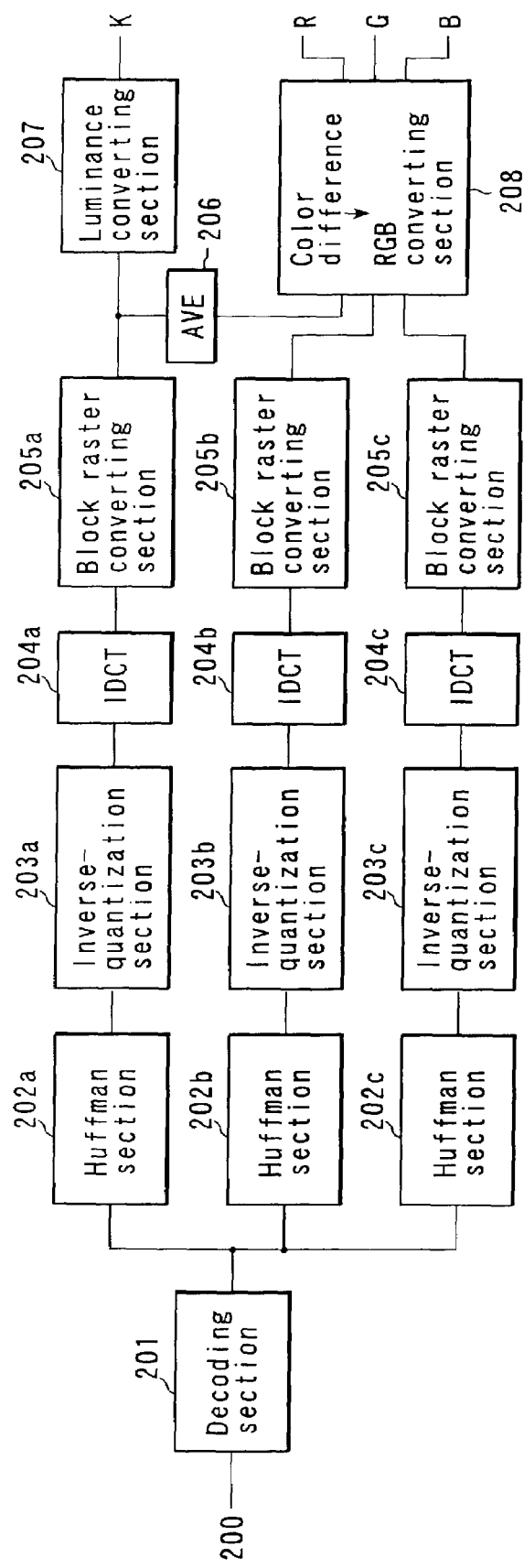
FIG. 22 is a diagram showing a detailed configuration of a decoding circuit adopting a principle of the present invention.

Moreover, although the memory cost at compression is reduced in the embodiments above, a similar effect can be acquired if the color signal is used with the low resolution and the monochrome signal is used with the high resolution even after decoding. That is, as shown in FIG. 22, the known JPEG decoding process is executed on an input signal 200 via a decoding section 201 by using Huffman sections 202a to 202c, inverse quantization sections 203a to 203c, IDCTs 204a to 204c, and block raster converting sections 205a to 205c. Concerning the luminance signal, the monochrome signal is output as it is at a luminance converting section 207. Then, by using the luminance resulting from 2-pixel averaging at the average operator 206, the conversion from the color difference signal into the image signals of RGB is executed according to the formula relating to the conversion from the YIQ into RGB above at 208, and the signal is output.

Besides, in the embodiments above, the color image signal is used only when in the flat section and the output of the color image signal is larger than that of the monochrome image signal and the monochrome image signal is used as it is as the luminance signal otherwise. However, the generation of the luminance signal is not limited to this example, and switching may be executed in accordance with conditions such as color/black character determination or existence of a white-base area.

Moreover, it may be used not only for the generation of the luminance signal but also for the generation of the color difference signal. By applying the monochrome image signal to the luminance signal as it is by utilizing the characteristic of the device whose color sensor has the low resolution, a more simple circuit configuration than some difference of the color can be selected.

Moreover, the conversion from the luminance signal and the color difference signal into the color image signal and the monochrome image signal during decoding is not limited to this method. The conversion may adaptively be switched by using the color difference signal as well for the conversion into the monochrome image signal. The same applies to the conversion from the color difference signal into the color image signal. Moreover, although an example in which the resolution of the color sensor is different by twice in a main scanning direction from the resolution of the monochrome sensor is mentioned in the embodiments above, it is not limited to the example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   an image pickup element which picks up an image and outputs a color image signal and a monochrome image signal;
   a controlling section which outputs a signal that selects a color image output or a monochrome image output; and
   a converting section which receives an input of the color image signal from the image pickup element, and in the case where the color image output is selected by the signal from the controlling section, outputs the color image signal, and in the case where the monochrome image output is selected, outputs a signal obtained by calculating an average of an average value of color image signals and a value of the monochrome image signal, instead of the monochrome image signal, only when the monochrome image signal falls within a specific density area and the average value of the color image signals is greater than the value of the monochrome image signal, and outputs the monochrome image signal in other cases.

2. An image processing apparatus according to claim 1, wherein
   the converting section corrects a concentration level of the monochrome image signal by using the color image signal when the monochrome image is output.

3. An image processing apparatus comprising:
   image pickup means for picking up an image and outputting a color image signal and a monochrome image signal;
   controlling means for outputting a signal that selects a color image output or a monochrome image output; and
   converting means for receiving an input of the color image signal from the image pickup means, and for, in the case where the color image output is selected by the signal from the controlling means, outputting the color image signal, and in the case where the monochrome image output is selected, outputting a signal obtained by calculating an average of an average value of color image signals and a value of the monochrome image signal, instead of the monochrome image signal, only when the monochrome image signal falls within a specific density area and the average value of the color image signals is greater than the value of the monochrome image signal, and outputting the monochrome image signal in other cases.

4. An image processing method comprising:
   picking up an image and outputting a color image signal and a monochrome image signal by a image pickup element;
   outputting a signal that selects a color image output or a monochrome image output by a controlling section; and
   receiving an input of the color image signal from the image pickup element, and in the case where the color image output is selected by the signal from the controlling section, outputting the color image signal, and in the case where the monochrome image output is selected, outputting a signal obtained by calculating an average of an average value of color image signals and a value of the monochrome image signal, instead of the monochrome image signal, only when the monochrome image signal falls within a specific density area and the average value of the color image signals is greater than the value of the monochrome image signal, and outputting the monochrome image signal in other cases.

5. An image processing method according to claim 4, wherein a concentration level of the monochrome image signal is corrected by using the color image signal when the monochrome image is output, by the converting section.

6. The image processing apparatus according to claim 1, further comprising a printer that prints out image data from the group consisting of the color image signal and the monochrome image signal.

7. The image processing apparatus according to claim 2, wherein the concentration level is a specific density area of the monochrome image signal.

8. The image processing apparatus according to claim 3, further comprising a printing means for printing out image data from the group consisting of the color image signal and the monochrome image signal.

9. The image processing apparatus according to claim 3, wherein the converting means corrects a concentration level of the monochrome signal by using the color image signal when the monochrome image is output.

10. The image processing apparatus according to claim 9, wherein the concentration level is a specific density area of the monochrome image signal.

11. The image processing method according to claim 4, further comprising printing out image data from the group consisting of the color image signal and the monochrome image signal.

12. The image processing method according to claim 5, wherein the concentration level is a specific density area of the monochrome image signal.

* * * * *